United States Patent
Kobayashi et al.

[11] Patent Number: 6,036,002
[45] Date of Patent: *Mar. 14, 2000

[54] PLASTIC CONVEYOR BELT AND CONVEYOR APPARATUS USING THE SAME

[75] Inventors: Shogo Kobayashi, Shizuoka; Kazuya Yoshida, Tokyo, both of Japan

[73] Assignee: Kansai Paint Co. Ltd., Tokyo, Japan

[*] Notice: This patent is subject to a terminal disclaimer.

[21] Appl. No.: 08/862,310

[22] Filed: May 23, 1997

[30] Foreign Application Priority Data

May 24, 1996 [JP] Japan ................................. 8-166536

[51] Int. Cl.[7] .................................................. B65G 17/06
[52] U.S. Cl. ................................................... 198/853
[58] Field of Search ..................... 198/851, 853

[56] References Cited

U.S. PATENT DOCUMENTS

| | | | |
|---|---|---|---|
| 2,852,129 | 9/1958 | Conner | 198/853 |
| 3,160,264 | 12/1964 | Raybould | 198/851 |
| 3,269,526 | 8/1966 | Imse et al. | 198/853 |
| 3,344,907 | 10/1967 | Valkenburgh | 198/851 |
| 3,425,536 | 2/1969 | Shader | 198/853 |
| 3,815,725 | 6/1974 | Linderman | 198/851 |
| 4,490,970 | 1/1985 | Curl | 198/853 |

*Primary Examiner*—Jospeh E. Valenza
*Attorney, Agent, or Firm*—Rader, Fishman & Grauer

[57] ABSTRACT

To provide a lightweight, rust-free conveyor which is easy to install, remove, and repair. In a plastic conveyor belt, belt element pieces which have connecting holes opening widthwise are joined by communicating the connecting holes lengthwise and are disposed at both widthwise ends. A rod is inserted in a common hole formed at a joint for connection at a lengthwise end, and the respective belt element pieces are rotatably joined around rods to form an endless belt. Rods are installed widthwise between the belt element pieces. A plastic conveyor belt is provided having plastic belt element pieces and rods composed of metallic cores and plastic sheaths, and a conveyor apparatus drives the plastic conveyor belt with a sprocket.

19 Claims, 6 Drawing Sheets

PLASTIC CONVEYOR BELT AND CONVEYOR APPARATUS USING THE SAME

BACKGROUND OF THE INVENTION

1. Field of the Invention

The present invention relates to a conveyor belt fabricated using plastics such as acetal resin and ABS resin, a method for manufacturing the conveyor belt, and a conveyor apparatus which employs the conveyor belt.

2. Description of the Prior Art

There are a variety of conventional transferring conveyor belts including textile ones, ones made of fabric coated with resin, ones composed of combinations of spiral wires, ones composed of combinations of spiral wires and rods, ones composed of belt element pieces in which rods are interconnected serially, and ones composed of rods wherein the ends of the rods overlap. These different types of conventional conveyor belts are used according to individual applications, considering the advantages and disadvantages of each type.

A conventional conveyor belt constituted by U-shaped belt element pieces joined with rods inserted in connecting holes, and the conventional belts constituted by rods with the ends thereof overlapping serially to join them are advantageous in that they allow a large space to be easily secured and permit easy cleaning since the carrying surfaces thereof are composed of rods. Therefore, these types of conventional conveyor belts have been extensively used in such applications as cooling, drying, and washing.

In addition, those types of conveyor belts allow sprocket teeth to engage with the rods so as to permit sprocket-based drive.

The sprocket drive prevents slippage from occurring and enables driving without applying high tension to the belts, thus high strength conveyor apparatuses including rolls are not needed.

For conventional conveyor belts, metallic materials such as stainless steel have been frequently employed for strength, ease of fabrication, and corrosion resistance during use.

In order to provide the carrying surface with strength, metals such as stainless steel are used for the rods and the belt element pieces in most cases. Metals have been used for belt element pieces composed of bent plates or rods interconnected by overlapping ends one after another because the materials need to be plastically deformed to the required shapes.

Metallic conveyor belts are advantageous in that they are strong, however, they are extremely heavy and difficult to handle when installing, removing, or repairing them. Employing stainless steel has also not been successful in completely preventing the occurrence of rust.

Another disadvantage is that each rod has to be welded, hooked, and bent to secure it, requiring much time and effort.

SUMMARY OF THE INVENTION

In view of the disadvantages and deficiencies of the prior art described above, the present invention provides a lightweight, easy-to-handle, rust-free conveyor belt which permits easy fabrication and installation in a conveyor apparatus employing the conveyor belt.

One advantage of the present invention is that the belt element pieces are formed using a plastic material and the rods connecting the belt element pieces have a core and sheath structure. The cores are composed of a metallic material while the sheaths are composed of a plastic material.

According to the present invention, the majority of the conveyor belt materials are plastic, permitting lighter weight, greater ease of handling, and freedom from rust.

Compared with a conventional heavy metallic belt, associated conveyor devices such as a roll and a frame need not be made very strong, thus enabling a lighter weight and a smaller size. Unlike conventional heavy, difficult-to-drive conveyor belts, the present invention allows a wider, longer conveyor belt to be easily driven. Moreover, since the rods have the core-and-sheath structure, the rods are lightweight and exhibit high resistance to bending, thereby providing adequate strength for the carrying surface.

Another advantage of the present invention is connecting holes in the belt element pieces and the rods are connected by fitting the rods in the connecting holes which prevents the belt element pieces and the rods from moving widthwise. The belt element pieces are free to rotate around the rods.

Conventionally, welding was required after the inserting process.

Yet another advantage of the present invention is that the rods are rotatably inserted in the connecting holes of the belt element pieces to form the endless belt structure.

The belt element piece can be rotatably connected with the rod by: providing two projections near both end sections, or terminus, of the rod with an interval approximately equal to the thickness of the belt element piece interposed between them. One or both of an outer projection and the connecting hole are elastically deformed inserting the rod into the connecting hole. The projection is pushed through an inner connecting hole of the belt element piece, and the belt element pieces are retained between the outer projection and an inner projection.

The distal end beyond the outer projection of the rod is inserted in an outer connecting hole of another belt element piece to be connected.

It is also possible to set the interval between the outer projection, or retainer, and the inner projection to the thickness of two belt element pieces and to clamp two element pieces between the outer projection and the inner projection.

The rod may be provided with three projections with an interval equal to the thickness of one belt element piece between adjacent pairs of projections. The outer projection may be elastically deformed and pushed through an outer belt element piece and a middle projection may be pushed through an inner belt element piece when inserting the rod. The outer belt element piece is retained between the outer projection and the middle projection, and the inner belt element piece is retained between the middle projection and the inner projection.

The projections provided on the rod may be seriate, or discontinuous, projections which extend in the circumferential direction of the outer peripheral surface of the rod.

In place of the inner projections provided on the rod, the diameter of the inserting section of the rod may be made smaller to form a step, or shoulder, between the inserting section and the central section. In this case, one or two projections are formed on the distal end of the rod.

As a further alternative, a projecting section or a recessed section provided on the inner surface of the connecting hole of the belt element piece and a recessed section or a projecting section provided on the rod may be connected by inserting the rod in the connecting hole so as to elastically deform the projecting sections or the recessed sections. For instance, a recessed section which is continuous in the circumferential direction is formed on the inner peripheral surface of the connecting hole of the belt element piece, and a discontinuous projecting section is formed in the circumferential direction on the outer peripheral surface of the rod. It is not always necessary to make the projecting section discontinuous, however, making it discontinuous is advantageous for ease of fitting and smooth rotation. Conversely, it is also possible to form the discontinuous projection section in the circumferential direction on the inner peripheral surface of the connecting hole of the belt element piece and to form a continuous recessed section in the circumferential direction on the outer peripheral surface of the rod.

In this case also, the rod may be connected with both outer and inner belt element pieces or only with the inner belt element piece. The projecting section may be either discontinuous or continuous.

It is further possible to form a groove section that has a width approximately as large as the thickness of the belt element piece at a position slightly closer to the center from the terminus of the rod which has a larger diameter than the connecting hole. The rod is pushed in the connecting hole to fit the connecting hole on the groove section. By setting the width of the groove to a width accommodating two belt element pieces, connection of the outer and inner belt element pieces can be accomplished at the same time.

Tapering the distal end of the rod allows the rod to be pushed in the connecting hole; providing it with a slit permits even easier pushing.

The diameters of the rod and the connecting hole are set so that the diameters of the projection and the stepped portion of the projecting section provided on the rod are the largest, then the diameter of the connecting hole is the next largest, and the diameter of the rod is smaller than the inside diameter of the connecting hole.

It is desirable to form the belt element pieces and the rod sheaths by using plastic materials of different hardness to prevent such accidents as chipping of the projecting sections, etc., at the time of fitting. The softer material is subject to compressive deformation.

There is no particular restriction as to whether the belt element pieces or the rods should use a hard material or a soft material, however, it is desirable to use the hard material for the rods to improve the strength of the rods.

For example, the belt element pieces may be formed using polyacetal resin and the rod sheaths may be formed using ABS resin.

The belt element piece may be constituted by a pair of rectangular connecting members at opposite longitudinal ends, each of which is provided with a connecting hole, and a slant member for joining the connecting members. The connecting members are provided with lengthwise crank-shaped sections which are joined at ends laterally shifted by the slant member, therefore, it is possible to connect the belt element pieces so that the outer surface is flat. This is advantageous in that, when one end of each element piece is retained by the projections or the shoulder on the rod, the connection can be accomplished without retaining the other longitudinal end of the belt element pieces. In other words, two arrays can be formed for the interval equivalent to one connecting hole to prevent one inner belt element piece from moving, thus making it possible to prevent two belt element pieces from moving.

Providing the connecting hole of the element piece with a notch, or cutout, which continues to the side surface allows it to be fitted to the rod by elastically deforming it.

According to the present invention, the middle portions of the rods which extend between the belt element pieces at both widthwise edges of the belt constitute the belt section of the conveyor belt. A sprocket can be fitted to drivingly engage the rods.

In the present invention, connecting by elastic deformation means fitting by making use of the deflective expansion based on the elastic deformation of the connecting holes and the compressive shrinkage which is the elastic deformation of the rods.

In other words, the connecting holes and the rods cannot be fitted together if they maintain the actual dimensions. They are connected in the fitting position by pushing them toward a predetermined position by applying pressure so as to make the elastic deformation take place.

By the time the components are fitted in the predetermined position, the elastic deformation no longer exists; and there is a gap between the fitting portions of the rod and the belt element piece, allowing them to rotate.

There is no need for welding as in the case of the conventional metallic belts. The present invention permits one-touch simple assembly and easy repair. For instance, if a rod is damaged, the unit can be disassembled to replace the damaged rod with a new one, thus permitting easy repair.

This is possible because the rods and the belt element pieces are composed of plastics.

More specifically, plastics exhibit vital properties, namely, a high degree of elastic deformation, a certain extent of strength, hardness and rigidity, and a small coefficient of friction.

Metals have limited elastic deformation, making them difficult to fit together and they are apt to incur permanent deformation.

On the other hand, materials having a high degree of elastic deformation cannot be successfully used unless they exhibit sufficient strength and rigidity to ensure sufficient strength at the connections. The use of materials that have a large coefficient of friction would not permit easy pushing in for fitting. Even if they allowed fitting, they would not be usable because they would prevent smooth rotation of the rods and the belt element pieces. Soft rubber or the like is undesirable.

To accomplish connection, the projecting section of the rod is compressed by the inner surface of the connecting hole to push it in the hole so that the belt element piece manages to clear the projecting section to implement the connection.

The required amount of elastic deformation may be determined according to the diameters of the connecting hole and the rod, the physical properties of plastics, the force for pushing in to fit the connecting hole and the rod, and the required strength of the fitted section.

The projecting sections of the innermost projection or shoulder may be any diameter as long as the diameter is large enough to prevent the connecting hole from passing over it. They are responsible for maintaining the inward movement of the belt element pieces and not allowing the belt element pieces to pass through.

There is no particular restriction to the number of arrays of the projections; it may be, for example, a total of three or four, two each for the individual connecting holes, or it may be two with an interval equivalent to two connecting holes, that is, the interval equivalent to the common holes.

There is no restriction on the shape of the belt element pieces as long as it permits two connecting holes that penetrate widthwise to be formed at ends in the direction of the length, and permits the common holes to be formed by combining the holes in series lengthwise.

It is also possible to dispose an auxiliary rod between rods or to bridge a spiral wire between rods. This enables a fine carrying surface and therefore it is effective for carrying small objects.

There is no particular restriction to the conveyor apparatus employing the conveyor belt in accordance with the present invention as long as the conveyor belt according to the present invention is extended over rolls or the like. It is preferable to drive the apparatus by using a sprocket matched to the pitches of the rods for engagement so as to prevent slippage.

Such a conveyor apparatus provides a large space and can be extensively used for applications including washing, drying, and cooling; as a specific example, it is suitably used for cooling bread.

DETAILED DESCRIPTION OF THE PREFERRED EMBODIMENTS

Figure 1:
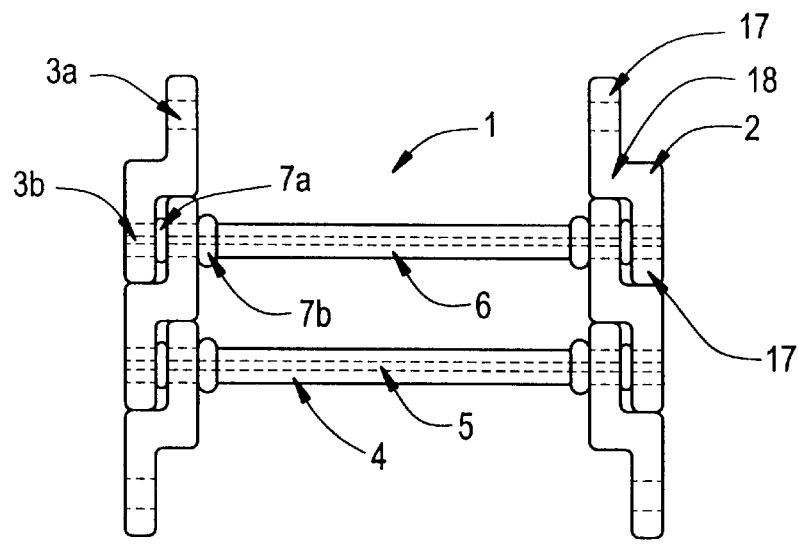
FIG. 1 is a top plan view of a conveyor belt which is an embodiment of the present invention.

FIG. 1 is a top plan view illustrative of a part of a conveyor belt in accordance with the present invention. Reference numeral 1 denotes a conveyor belt, and reference numeral 2 denotes a belt element piece. The belt element piece 2 includes a pair of rectangular connecting pieces 17 extending lengthwise in the longitudinal direction of belt 1, and a joining piece 18. Joining piece 18 joins the connecting pieces 17, shifting them widthwise, or laterally, the thickness of a connecting piece 17. The section of the belt element piece 2 in the lengthwise direction is crank-shaped. The connecting pieces 17 have connecting holes 3a, 3b.

The belt element pieces 2 are combined lengthwise. This embodiment uses the crank-shaped belt element piece as the belt element piece 2. A plurality of the belt element pieces 2 are combined lengthwise (i.e. vertically in FIG. 1) to form an edge of conveyor belt 1.

In this embodiment, the upper connecting piece 17 is located toward the interior of the belt 1, while the lower connecting piece 17 is located at the edge of the belt 1. The lower connecting piece is joined to the upper connecting piece of the following belt element piece. However, the present invention is not limited thereto; the upper connecting piece may be located at the edge, while the lower connecting piece may be located toward the interior to fulfill the joining.

An upper connecting hole 3a is formed in the upper connecting piece 17 of the belt element piece 2, while a lower connecting hole 3b is formed in the lower connecting piece 17. The lower connecting hole 3b of the upper belt element piece 2 is aligned with the upper connecting hole 3a of the next belt element piece 2 so as to form a common hole.

A rod 4 is inserted in the common hole to accomplish the connection.

The rod 4 is composed of a core section 5 of a metal rod and a plastic sheath section 6.

In this embodiment, the belt element pieces 2 and the rods 4 are prevented from coming off and from being dislocated, by elastically deforming a projection provided on the rod. The diameter of the projection is larger than the connecting hole.

The rods 4 and connecting holes 3a, 3b may also be joined by bonding or the like, however, pushing in and fitting the rods 4 in the connecting holes 3a, 3b is preferable since it permits one-touch, easier assembly.

Figure 2:
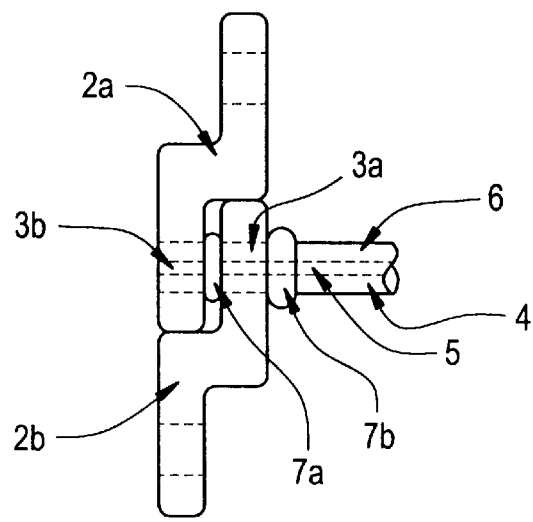
FIG. 2 is a top plan view of a connected section of the embodiment shown in FIG. 1.

FIG. 2 is a top plan enlarged view of a fitted section of the embodiment shown in FIG. 1. For the purpose of description, the upper belt element piece in the drawing is denoted as 2a, while the lower belt element piece is denoted as 2b.

Formed on the outer peripheral surface of the rod 4 in the circumferential direction are a row of outer projections 7a and a row of inner projections 7b. The outer projection 7a is elastically deformed when pushed into the connecting hole 3a to retain the upper connecting piece of the belt element piece 2 between the projections 7a and 7b. The diameters of the projections 7a, 7b are larger than the diameter of the connecting hole 3a.

To accomplish the above connection, the rod 4 is first inserted in the upper connecting hole 3a of the lower belt element piece 2b.

The projection 7a comes in contact with the connecting hole 3a, but the rod 4 is forcibly pushed in. More specifically, the inner surface of the upper connecting hole 3a compresses the outer projection 7a so that it allows the outer projection 7a to pass through the connecting hole 3a. The outer projection 7a is pushed in until the belt element piece 2 is fitted between the outer projection 7a and the inner projection 7b. Once the outer projection 7a has passed through the upper connecting hole 3a, which has compressed the outer projection 7a, the outer projection 7a recovers its original diameter that is larger than the connecting hole 3a so as to prevent the rod 4 from moving out of the upper connecting hole 3a. The compressive deformation of the outer projection 7a is elastic deformation.

Alternatively, the connecting hole may compress and deform, or both may compress and deform.

In this embodiment, only the upper connecting hole 3a of the lower belt element piece 2b has been fitted, the lower connecting hole 3b of the upper belt element piece 2a is slid on to the rod 4. Similarly, the upper connecting hole 3a of the upper belt element piece 2a is also fitted to the following rod 4, so there is no relative widthwise movement. Thus, using the crank-shaped belt element piece 2 makes it possible to prevent two belt element pieces from moving widthwise by joining only one connecting hole, providing an advantage in that only the connecting hole 3a has to clear the outer projection 7a. The number of times of clearing the outer projection 7a should preferably be minimized to reduce the chance of damage to the outer projection 7a, even though the projection is elastic and recoverable.

Figure 3:
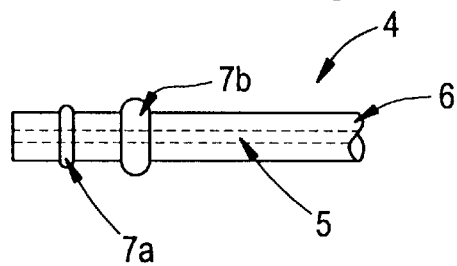
FIG. 3 is a top plan view of a connected section of a rod of the embodiment shown in FIG. 1.
Figure 4:
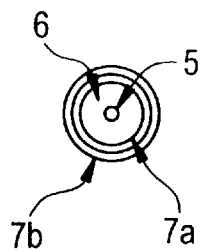
FIG. 4 is a sectional view of the rod.

FIG. 3 is a top plan view illustrating the projections of the rod of the embodiment shown in FIG. 1 and FIG. 4 is a sectional view thereof. The outer projection 7a and the inner projection 7b are formed in the circumferential direction on the outer peripheral surface of the rod 4. The distance from the terminus to the outer projection 7a and the distance from the outer projection 7a to the inner projection 7b are equal to or slightly greater than the length of the connecting holes 3a, 3b. The diameter and width of the outer projection 7a are determined according to the height and width of the projection, base on the desired amount of elastic deformation of the projection 7a. As previously mentioned, the diameter and width of the projection 7a are decided by the size of the connecting hole 3a, the diameter of the rod 4, the physical properties of plastic, the pushing-in force, the desired strength of the connected sections, etc., so that the projection 7a recovers after it is compressed and prevents the belt element pieces 2 from shifting outward.

In this embodiment, the diameter of the rod 4 and the diameter of the connecting hole 3a are equally set to 6 mm, while the diameter of the outer projection 7a is set to 6.4 mm. The height of the projection 7a is 0.2 mm and the width thereof is 0.2 mm. The diameter and width of the inner projection 7b may be larger values since the inner projection 7b serves simply to prevent the belt element pieces 2 from shifting inward and does not have to clear the connecting hole 3a. The diameter of the inner projection 7b is 7 mm and the width thereof is 0.5 mm in this embodiment.

The belt element pieces 2 must be allowed to freely rotate on the rods 4. The diameter of the rods 4 may alternatively be made smaller than the connecting holes 3a, 3b.

As shown in FIG. 4, the rod 4 and the connecting holes 3a, 3b share the same diameter, the outer projection 7a has a relatively larger diameter, and the inner projection 7b has a still larger diameter. It is also seen that the rod 4 comprises a core section 5 and a sheath section 6. The diameter of the core section 5 is based on the diameter and length of the rod 4 and the weight of the object to be carried on the conveyor belt 1. In this embodiment, the length of the rod 4 is 600 mm, and the core section 5 is composed of stainless steel with a diameter of 2 mm.

Figure 5:
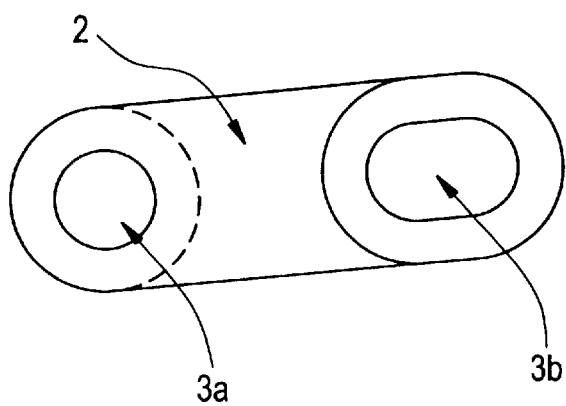
FIG. 5 is a side view of a belt element piece.

FIG. 5 is a side view of the belt element piece 2.

In this embodiment, the lower connecting hole 3b is shaped slightly elliptical. To join the belt element pieces 2 and the last rod 4 to form an endless loop, the lower connecting hole 3b is fitted on the rod 4 while bending the rod 4. Using the elliptical hole for the lower connecting hole 3b of the last belt element piece 2 is advantageous in that the last rod 4 can be inserted easily.

Figure 6:
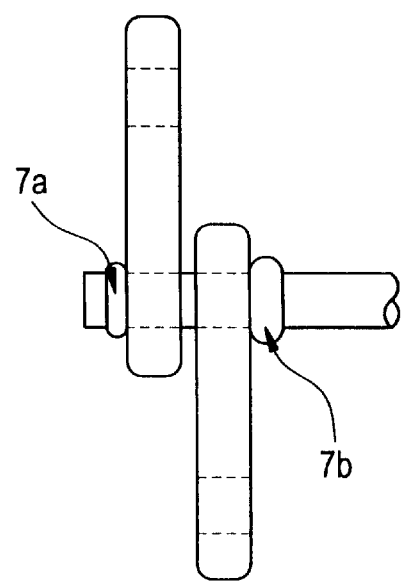
FIG. 6 is a top plan view of a connected section of another embodiment.

FIG. 6 is a top plan view of the connected section of another embodiment.

In this embodiment, both the upper connecting hole 3a and the lower connecting hole 3b of the lower belt element piece 2b are retained between the outer projection 7a and the inner projection 7b on the rod 4. This permits the lower connecting hole 3b to be firmly retained also. In this embodiment, the element pieces have rectangular lengthwise sections rather than crank-shaped sections. This embodiment is advantageous in that it permits easier fabrication of the belt element pieces 2, although the outer edge of the belt cannot be made flat. It also allows the last connection to be accomplished without the need for an elliptical connecting hole.

Figure 7:
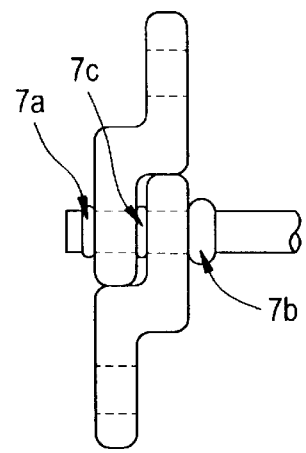
FIG. 7 is a top plan view of a connected section of still another embodiment.

FIG. 7 is a top plan view illustrative of the fitted section of the embodiment.

In this embodiment, the upper connecting hole 3a is retained between a middle, or intermediate, projection 7c and the inner projection 7b, and the lower connecting hole 3b is retained between the outer projection 7a and the middle projection 7c. This also enables the lower connecting hole 3b to be retained firmly, and the projection 7c prevents friction between the belt element pieces 2.

Figure 8:
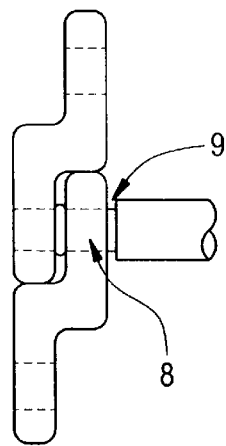
FIG. 8 is a top plan view of a connected section of yet another embodiment.

FIG. 8 is a top plan view of the fitted section of yet another embodiment.

In this embodiment, a small-diameter section 8 is provided near the end of the rod to make a stepped rod; a stepped section, or shoulder, 9 prevents the belt element piece 2 from shifting inward. The lower belt element piece 2b is retained between the projection and the shoulder 9 of the rod 4.

Figure 9:
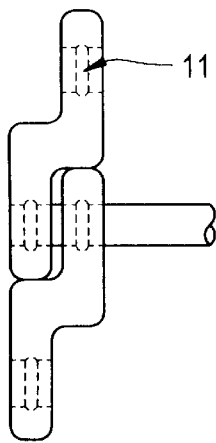
FIG. 9 is a top plan view of a connected section of another embodiment.

FIG. 9 is a top plan view of the fitted section of still another embodiment.

In this embodiment, the inner peripheral surface of the connecting holes 3a, 3b of a belt element piece 2 are provided with a recessed section 11 which continues in the circumferential direction. The outer peripheral surface of the rod 4 is provided with a discontinuous projecting section extending in the circumferential direction. The recessed section 11 and the projecting section are fitted together. It is not always necessary to make the recessed section discontinuous, however, making it discontinuous presents advantages such as easier fitting and smoother rotation.

Figure 10:
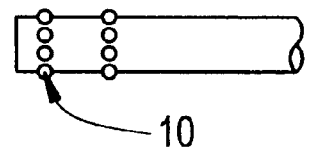
FIG. 10 is a top plan view of a fitted section of the rod of the embodiment shown in FIG. 9.

FIG. 10 is a top plan view of the fitted section of the rod 4 according to the embodiment shown in FIG. 9. It can be seen that a discontinuous projecting section 10 is formed in the circumferential direction on the outer peripheral surface of the rod 4.

Figure 11:
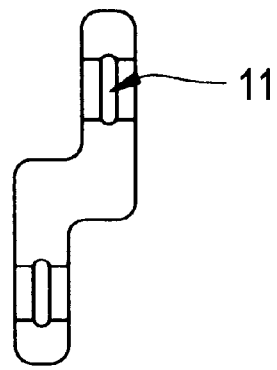
FIG. 11 is a sectional view illustrating a fitted section of a belt element piece of the embodiment shown in FIG. 9.

FIG. 11 is a sectional view of the fitted section of the belt element piece 2 according to the embodiment shown in FIG. 9.

It can be seen that the recessed section 11 which continues in the circumferential direction is formed on the inner peripheral surface of the connecting holes 3a, 3b of the belt element piece 2.

Figure 12:
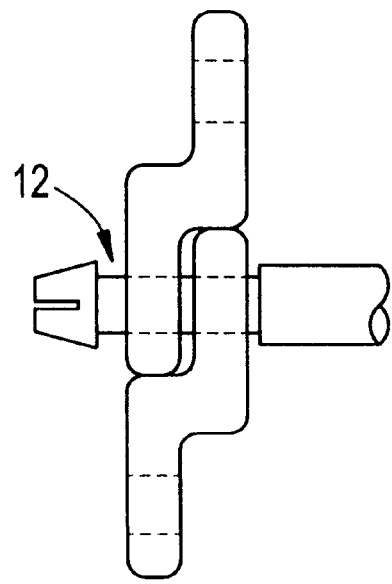
FIG. 12 is a top plan view of a connected section of another embodiment.

FIG. 12 is a top plan view of the fitted section of another embodiment.

In this embodiment, an annular groove section 12, which has a diameter slightly smaller than the connecting holes 3a, 3b of the belt element piece 2, is formed at a position slightly inward from the end of the rod 4. The annular groove section 12 receives the connecting holes 3a, 3b. An outer shoulder 13a and an inner shoulder 13b retain the belt element pieces 2 between them to prevent the belt element pieces 2 from laterally shifting with respect to one another. In this embodiment, the rod 4 is shaped so that its diameter tapers toward the terminus 14 from the outer shoulder 13a of the annular groove section 12. The diameter of the rod 4 at the terminus 14 is smaller than the diameter of the connecting holes 3a, 3b, thereby permitting the end of the rod 4 to be pushed easily through the connecting holes 3a, 3b. Further, a slit 15 is formed in the diametral direction from the terminus 14 of the rod 4 to the vicinity of the outer shoulder 13a of the annular groove section 12. The slit 15 compresses at the time of pushing in the rod 4 to enable easier fitting.

Figure 13:
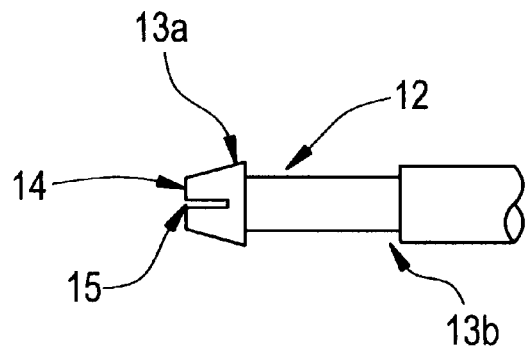
FIG. 13 is a top plan view of the connected section of a rod of the embodiment shown in FIG. 12.

FIG. 13 is a top plan view illustrating the fitted section of the rod 4 of the embodiment shown in FIG. 12.

It can be seen that the diameter of the rod 4 is tapered from the outer shoulder 13a of the annular groove section 12 toward the extreme end 14 so that the diameter of the terminus 14 is smaller than the diameter of the connecting holes 3a, 3b. The diametral slit 15 is formed from the distal end of the rod to the vicinity of the outer shoulder 13a of the annular groove section 12.

Figure 14:
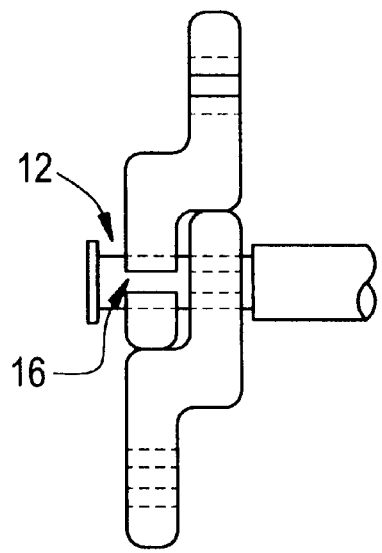
FIG. 14 is a top plan view illustrating a connected section of another embodiment.

FIG. 14 is a top plan view illustrating the connected section of another embodiment.

Like the previous embodiment, this embodiment is also configured to join the annular groove section 12 with the connecting holes 3a, 3b. However, the connecting holes 3a, 3b of the belt element piece 2 are provided with a notch, or cutout, 16 which extends to the side surface, so that the rod 4 is pushed and fitted in through the connecting holes 3a, 3b by elastically deforming the notch 16. In this case, it is preferable to arrange adjacent belt element pieces 2 so that the notches 16 of the upper connecting holes 3a and the lower connecting holes 3b face opposite directions to make it difficult to slip off the rod 4. This embodiment is advantageous in that the one of the connecting holes 3a, 3b need not be elliptical for connection since the rod 4 is pushed in through the connecting holes 3a, 3b having a notch 16.

Figure 15:
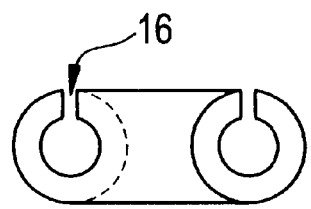
FIG. 15 is a side view illustrating a belt element piece of the embodiment shown in FIG. 14.

FIG. 15 is a side view illustrating the belt element piece 2 of the embodiment shown in FIG. 14.

It can be seen that the notches 16 extend through to the connecting holes 3a, 3b.

In this embodiment, the belt element pieces 2 are formed using polyacetal resin, the rod cores 5 are composed of stainless steel, and the sheath section 6 is composed of ABS resin. The materials used, of course, are not limited thereto as long as the belt element pieces 2 and the rod sheaths 6 are composed of a plastic material and the rod cores 5 are composed of a metal. Using different plastic materials for the belt element pieces 2 and the rod sheath sections 6 presents an advantage of less friction.

The belt element pieces 2 and the rods 4 can be made by molding, for example, using a two-surface slide method.

Figure 16:
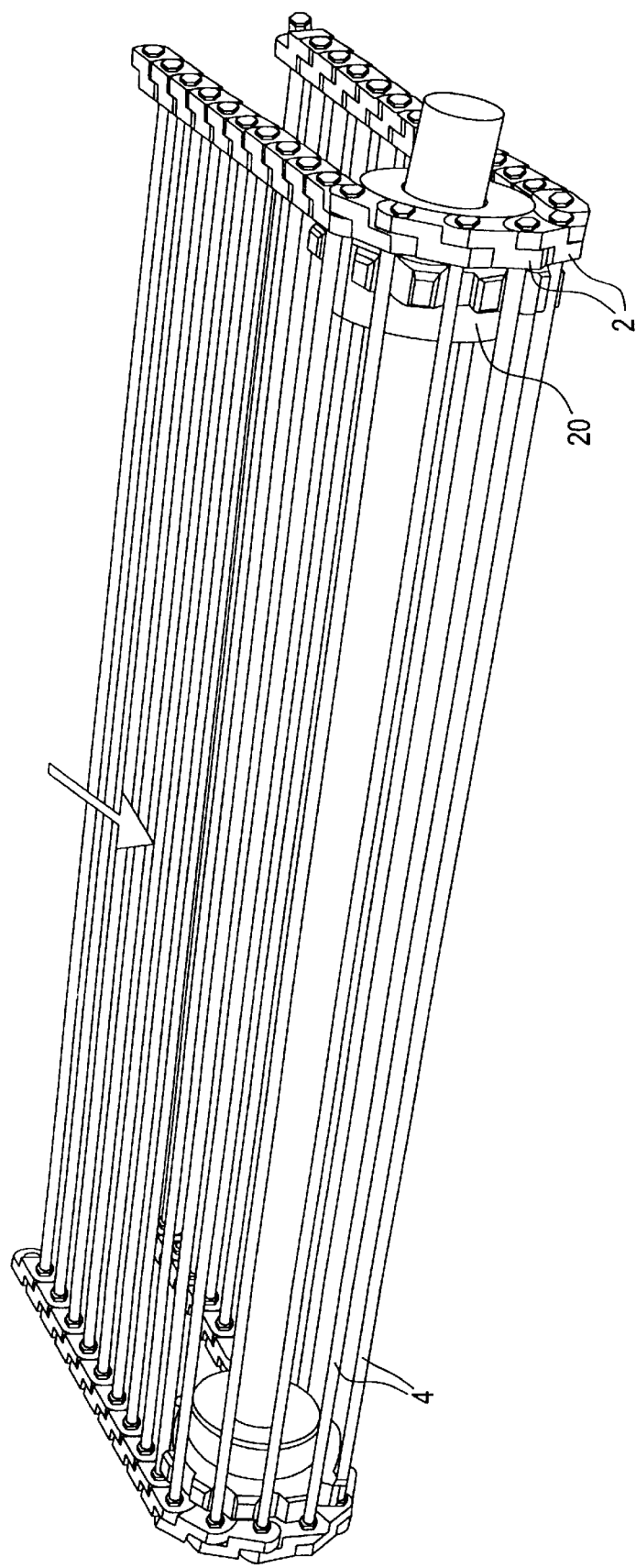
FIG. 16 is a perspective view of the present conveyor belt engaging a sprocket.

FIG. 16 illustrates a sprocket 20 engaging the rods 4.

As described above, the conveyor belt in accordance with the present invention is lightweight, easy to handle, easy to wash, and rust-free, and it permits quick, easy fabrication.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The entire disclosure of Japanese Patent Application No. 8-166536 filed May 24, 1996, including specification, drawings and claims are herein incorporated by reference in its entirety.

What is claimed is:

1. A conveyor belt extending in a longitudinal direction, the conveyor belt comprising:

a plurality of belt element pieces, each of said belt element pieces including a first hole proximate a first longitudinal end of each said belt element piece and a second hole proximate a second longitudinal end of each said belt element piece, said first and second holes extending transversely through each of said belt element pieces;

a plurality of rods, each of said plurality of rods extending along an axis and including a first axial terminus and an opposite second axial terminus, wherein each of said plurality of rods pivotally connects four of said plurality of belt element pieces, said first terminus of said one rod penetrating both said first hole of a first of said four belt element pieces and said second hole of a second of said four belt element pieces, said second terminus of said one rod penetrating both said first hole of a third of said four belt element pieces and said second hole of a fourth of said four belt element pieces;

a first retainer on said one rod proximate said first axial terminus, said first retainer axially retaining said first and second belt element pieces with respect to said one rod;

a second retainer on said one rod proximate said second axial terminus, said second retainer axially retaining said third and fourth belt element pieces with respect to said one rod, wherein said first and second retainers project radially outward from said one rod;

a first shoulder on said one rod inboard from said first retainer, at least one of said first and second belt element pieces being axially interposed between said first retainer and said first shoulder; and a second shoulder on said one rod inboard from said second retainer, at least one of said third and fourth belt element pieces being axially interposed between said second retainer and said second shoulder, wherein at least one of said first and second holes of said belt element pieces or each of said first and second retainers temporarily deforms during passage of the respective first or second hole over the respective first or second retainer.

2. The conveyor belt described in claim 1, wherein one of said first and second belt element pieces is axially interposed between said first retainer and said first shoulder, and another one of said first and second belt element pieces is axially interposed between said first axial terminus and said first retainer; and wherein one of said third and fourth belt element pieces is axially interposed between said second retainer and said second shoulder, and another one of said third and fourth belt element pieces is axially interposed between said second axial terminus and said second retainer.

3. The conveyor belt described in claim 1, wherein said first and second retainers project radially outward from said one rod less than said first and second shoulders.

4. The conveyor belt described in claim 1, wherein said first and second belt element pieces are axially interposed between said first retainer and said first shoulder, and said third and fourth belt element pieces are axially interposed between said second retainer and said second shoulder.

5. The conveyor belt described in claim 4, further comprising:

a first intermediate retainer axially interposed between said first and second belt element pieces; and a second intermediate retainer axially interposed between said third and fourth belt element pieces.

6. The conveyor belt described in claim 1, further comprising:

a third retainer on said one rod inboard from said first retainer, said third retainer axially retaining another one of said first and second belt element pieces with respect to said one rod; and a fourth retainer on said one rod inboard from said second retainer, said third retainer axially retaining another one of said third and fourth belt element pieces with respect to said one rod, wherein said first retainer is cooperatively engaged within said first hole of said first belt element piece, said second retainer is cooperatively engaged within said second hole of said second belt element piece, said third retainer is cooperatively engaged within said first hole of said third belt element piece, and said fourth retainer is cooperatively engaged within said second hole of said fourth belt element piece.

7. The conveyor belt described in claim 5, wherein said first, second, third and fourth retainers project radially outward from said one rod and cooperatively engage respective grooves formed within said first hole of said first belt element piece, said second hole of said second belt element piece, said first hole of said third belt element piece and said second hole of said fourth belt element piece.

8. The conveyor belt described in claim 7, wherein said first, second, third and fourth retainers are ridges circumscribing said one rod.

9. The conveyor belt described in claim 1, wherein said first retainer is conical, tapering toward said first axial terminus for axially retaining said first and second belt element pieces with respect to said one rod; and wherein said second retainer is conical, tapering toward said second axial terminus for axially retaining said third and fourth belt element pieces with respect to said one rod.

10. The conveyor belt described in claim 9, wherein each of said first and second retainers include a diametrical slit.

11. The conveyor belt described in claim 1, wherein each of said belt element pieces include a first transverse cutout extending through to said first hole and a second transverse cutout extending through to said second hole.

12. The conveyor belt described in claim 1, wherein said plurality of belt element pieces are plastic.

13. The conveyor belt described in claim 1, wherein one of said first and second holes is elliptical, and wherein one of said third and fourth holes is elliptical.

14. The conveyor belt described in claim 1, wherein said first longitudinal end is laterally offset with respect to said second longitudinal end.

15. A conveyor apparatus comprising:

a plurality of belt element pieces, each of said belt element pieces including a first hole proximate a first longitudinal end of each said belt element piece and a second hole proximate a second longitudinal end of each said belt element piece, said first and second holes extending transversely through each of said belt element pieces;

a plurality of rods, each of said plurality of rods extending along an axis and including a first axial terminus and a second axial terminus opposite said first axial terminus;

a rotatable sprocket engaging said plurality of the rods, wherein each of said plurality of rods pivotally connects four of said plurality of belt element pieces, said first terminus of said one rod penetrating both said first hole of a first of said four belt element pieces and said second hole of a second of said four belt element pieces, said second terminus of said one rod penetrating both said first hole of a third of said four belt element pieces and said second hole of a fourth of said four belt element pieces;

a first retainer on said one rod proximate said first axial terminus, said first retainer axially retaining said first and second belt element pieces with respect to said one rod;

a second retainer on said one rod proximate said second axial terminus, said second retainer axially retaining said third and fourth belt element pieces with respect to said one rod, wherein said first and second retainers project radially outward from said one rod;

a first shoulder on said one rod inboard from said first retainer, at least one of said first and second belt element pieces being axially interposed between said first retainer and said first shoulder; and a second shoulder on said one rod inboard from said second retainer, at least one of said third and fourth belt element pieces being axially interposed between said second retainer and said second shoulder, wherein at least one of said first and second holes of said belt element pieces or each of said first and second retainers temporarily deforms during passage of the respective first or second hole over the respective first or second retainer.

16. A method of manufacturing a conveyor belt comprising:

a plurality of belt element pieces, each of said belt element pieces including a first hole proximate a first longitudinal end of each said belt element piece and a second hole proximate a second longitudinal end of each said belt element piece, said first and second holes extending transversely through each of said belt element pieces; and a plurality of rods, each of said plurality of rods extending along an axis and including a first axial terminus and an opposite second axial terminus, wherein each of said plurality of rods pivotally connects four of said plurality of belt element pieces, said first terminus of said one rod penetrating both said first hole of a first of said four belt element pieces and said second hole of a second of said four belt element pieces, said second terminus of said one rod penetrating both said first hole of a third of said four belt element pieces and said second hole of a fourth of said four belt element pieces;

a first retainer on said one rod proximate said first axial terminus, said first retainer axially retaining said first and second belt element pieces with respect to said one rod;

a second retainer on said one rod proximate said second axial terminus, said second retainer axially retaining said third and fourth belt element pieces with respect to said one rod, wherein said first and second retainers project radially outward from said one rod;

a first shoulder on said one rod inboard from said first retainer, at least one of said first and second belt element pieces being axially interposed between said first retainer and said first shoulder; and a second shoulder on said one rod inboard from said second retainer, at least one of said third and fourth belt element pieces being axially interposed between said second retainer and said second shoulder, wherein the method comprises:

pushing each of the rods into the respective connecting hole of the belt element piece until it reaches a predetermined fitting position; and temporarily deforming at least one of said first and second holes of said belt element pieces or each of said first and second retainers during passage of the respective first or second hole over the respective first or second retainer.

17. The conveyor belt described in claim 1, wherein each said rod has a metallic core extending along said axis, and a plastic sheath circumscribing said metallic core.

18. The conveyor belt described in claim 15, wherein each said rod has a metallic core extending along said axis, and a plastic sheath circumscribing said metallic core.

19. The method described in claim 16, wherein each said rod has a metallic core extending along said axis, and a plastic sheath circumscribing said metallic core.

* * * * *

UNITED STATES PATENT AND TRADEMARK OFFICE
CERTIFICATE OF CORRECTION

PATENT NO. : 6,036,002
DATED : March 14, 2000
INVENTOR(S) : KOBAYASHI et al.

It is certified that error appears in the above-indentified patent and that said Letters Patent is hereby corrected as shown below:

Cover page should read;

[73] Assignees: Kobayashi Engineering Works Ltd., Shizuoka, Japan;

Nippon Filcon Co., Ltd., Tokyo, Japan

Signed and Sealed this

Twenty-seventh Day of March, 2001

*Attest:*

NICHOLAS P. GODICI

*Attesting Officer*   Acting Director of the United States Patent and Trademark Office